(12) United States Patent
Guerrero (10) Patent No.: US 7,051,608 B2
(45) Date of Patent: May 30, 2006

(54) GYROSCOPIC ACTUATOR

(75) Inventor: Juan José Guerrero, Madrid (ES)

(73) Assignee: Ingenieria, Diseno Y Analisis, S.L., Madrid (ES)

( * ) Notice: Subject to any disclaimer, the term of this patent is extended or adjusted under 35 U.S.C. 154(b) by 104 days.

(21) Appl. No.: 10/487,120

(22) PCT Filed: Oct. 11, 2002

(86) PCT No.: PCT/ES02/00482

§ 371 (c)(1),
(2), (4) Date: Feb. 13, 2004

(87) PCT Pub. No.: WO03/042632

PCT Pub. Date: May 22, 2003

(65) Prior Publication Data

US 2004/0173037 A1 Sep. 9, 2004

(30) Foreign Application Priority Data

Oct. 17, 2001 (ES) ................................ 200102290

(51) Int. Cl.
*G01C 19/54* (2006.01)
*G01C 19/02* (2006.01)

(52) U.S. Cl. ............................ 74/5.4; 74/5.22; 74/5.34

(58) Field of Classification Search ................ 74/5.22, 74/5.37, 5.4, 5.34, 5.47, 5.7, 84 R, 84 S
See application file for complete search history.

(56) References Cited

U.S. PATENT DOCUMENTS

| | | | | |
|---|---|---|---|---|
| 2,813,430 A | * | 11/1957 | Lehde | ........................ 74/5.4 |
| 2,856,142 A | * | 10/1958 | Haviland | ....................... 74/5.7 |
| 2,857,122 A | * | 10/1958 | Maguire | ........................ 74/5.7 |
| 3,336,811 A | * | 8/1967 | Klemes et al. | ................ 74/5 R |
| 3,702,569 A | * | 11/1972 | Quinn et al. | ................. 74/5.47 |
| 4,345,661 A | | 8/1982 | Nishikawa | |
| 4,550,926 A | | 11/1985 | MacIsaac | |
| 4,817,550 A | | 4/1989 | Gutsche | |
| 4,863,404 A | | 9/1989 | Salo | |
| 4,930,807 A | | 6/1990 | Lachaize | |
| 4,951,514 A | * | 8/1990 | Gubin | ........................ 74/5.37 |
| 5,112,012 A | | 5/1992 | Yuan et al. | |
| 5,573,265 A | | 11/1996 | Pradel et al. | |
| 5,826,829 A | | 10/1998 | Holmes | |
| 5,876,148 A | | 3/1999 | Kraps | |
| 5,931,421 A | | 8/1999 | Surauer et al. | |
| 6,135,392 A | | 10/2000 | Wakugawa | |
| 6,705,174 B1 | * | 3/2004 | Tippett | ....................... 74/5.37 |
| 6,907,800 B1 | * | 6/2005 | Inman | .......................... 74/5.4 |

FOREIGN PATENT DOCUMENTS

| | | |
|---|---|---|
| DE | 4116837 | 3/1992 |
| FR | 2563487 | 10/1985 |
| JP | 57182505 | 11/1982 |

* cited by examiner

Primary Examiner—Roger Pang
(74) Attorney, Agent, or Firm—Lucas & Mercanti, LLP (57) ABSTRACT

The gyroscopic actuator is a new device based on a mechanism designed to make us of the conservation of the kinetic momentum, so that it supplies a torque (momentum) to the platform where it is located. Thus it can orientate this platform in pitching, rolling or yawing, so that it achieves the attitude that a control system requires. Its scheduled use is in aeronautical fields (operation control in aeroplanes), automotion (stabilization of any type of land vehicle), naval (maneuvers and stabilization of naval platforms) and aerospace (satellite attitude control).

7 Claims, 5 Drawing Sheets

GYROSCOPIC ACTUATOR

The gyroscopic actuator is a device that enables the platform that it is installed upon to be orientated, applying, to do so, the law of conservation of the kinetic momentum. This orientation is achieved without resorting to the physical properties of the surrounding environment (water or air). Therefore the platform will not have to have any (aerodynamic or hydrodynamic) control surfaces.

Its scheduled applications are:

Aeronautics for fixed wing aeroplanes, on being able to replace the aerodynamic control surfaces of the aeroplanes (wings, rudders, etc.), carrying out rotations in pitching, rolling or yawing with the gyroscopic actuator.

Helicopters, by replacing the tail rotor, which generates the compensating torque of the reaction torque due to the main rotor. The actuator is responsible for producing this compensating torque and permitting the control of the helicopter in yawing.

Naval, on being able to replace the rudders of boats and vessels, and carrying out the manoeuvres with the gyroscopic actuator.

Stabilisation of land vehicle (cars, lorries, coaches and trains), on being able to produce torques that oppose the overturning torques in direction changes during the running of the vehicle.

TECHNIQUE SECTOR

The invention, insofar as its applications are concerned, has to do with the aeronautical, naval and automotive sectors. It uses the following engineering branches: mechanical, electrical and electronic.

STATE OF THE TECHNIQUE AND JUSTIFICATION OF THE NEED

This type of device is developed in the aerospace sector. There are numerous patents, above all North American ones, which express the state of the technique in this sector. The following can be given as examples: US006135392A, US005826829A and US005931421A, which also refer to other patents.

The use that this type of device bestows upon the satellites if the attitude control of the platform to achieve an adequate orientation of the onboard equipment. The gyroscopic devices used are known as inertia wheel assemblies, namely reaction wheel assemblies (RWA) or also momentum wheel assemblies (MWA). They consist of an assembly with 3 wheels or discs, placed orthogonally according to the three-dimensional axes of reference of the satellite, which when spinning, generate a torque, each one in their axis. To produce a certain torque that will change the orientation of the satellite, the wheels turn so that the resulting torque produced by the orthogonal composition of the three produced is suitable to move the structure as required.

The way to produce more or less torque in a certain axis of the reference system is to accelerate or decelerate the spin of the relative RWA or MWA. With this device maximum torques of 1.6 Newton-metre (N-m) can be generated.

There are RWA/MWA devices offered by Honeywell, such as models HR12, HR14, HR16, HM 4520 and HR2010/HR4510, whose basic characteristics are spin speeds of around 5000 rpm, weight between 9 and 11 kg, maximum diameters of 300 to 40 mm and resulting torques from 0.1 to 0.2 N-m.

Because the values in the resulting torque are so small, other devices have been developed that manage to increase it slightly. This is the case of the so-called momentum wheel platform (MWP) described in patent US005112012, based on three RWA/MWA units mounted on a flat triangular plate, which contains a series of screws at the corners moved by motors step by step so that the orientation of the plate can be controlled, by moving the screws, which on rotating incline it, which produces an increase in the resulting momentum. However the increase obtained is still very small, as rapid movements are not obtained, by turning the screws.

Later, a new device was developed, called control moment gyroscope (CMG), also marketed by Honeywell, consisting of a spherical environmental which rotates at 6000 rpm mounted on a multi-axial gimbal assembly. It achieves a maximum torque of 305 N-m, however, its dimensions are large: one metre in diameter and 53 kg. weight.

The torque generating devices in space, due to the limited values that are delivered and their high cost, are practically unfeasible for land operations, where the torques required may be very high, depending on the applications.

The gyroscopic actuator is conceived as a device with suitable dimensions for the application where it is going to be requested and able to generate the range of torques that this application requires. It achieves these capacities by combining the spin and nutation movements with a peculiar geometry; instead of inertia wheels it uses rings, which bestows upon it important possibilities as will be seen in this presentation. As an example, with some simple materials (carbon steel), a spin speed of 3000 rpm, a maximum diameter of 300 mm and height of 350 mm, with a total weight of 10 kg, it manages to generate torques of over 650 N-m, for an indefinite time. Obviously, with other dimensions considerably higher resulting torques can be obtained.

The philosophy of the conception of the gyroscopic actuator is based on the fact that the limitations of the torque supplied are established by the rigidity of the material making up the rings of the mechanism and of the electronics associated with the motor that activates the nutation movement.

Due to the possibility that the gyroscopic actuator has of generating a mechanical torque on the platform where it is located and as a result, of varying the orientation of this platform, its possible applications are very extensive, as seen above. Below, the need for each one of the applications indicated is justified.

Aeronautics. The control of fixed wing aeroplanes in pitching, rolling and yawing, is carried out through the aerodynamic control surfaces, which are placed on the wings, stabilisers and tail rudder. Although there are many variants on the basic configuration, this control modality is based on the aerodynamic resistance that these surfaces produce, on varying their initial layout to exercise the manoeuvre requested. By means of the aerodynamic resistance they produce, resulting momentums and forces appear on the structural assembly of the aeroplane, thus carrying out the manoeuvre sought.

The gyroscopic actuator produces a series of torques on the structural assembly of the aeroplane so that this is forced to change its orientation on the three axes of the reference system linked to it, thus producing rotations in pitching, rolling and yawing, which achieve the manoeuvre requested.

The need becomes obvious as the gyroscopic actuator presents the following advantages over the conventional procedure (aerodynamic surfaces):

No aerodynamic resistances associated with its own operation take place, which involve an added energy consumption.

It manages to eliminate all the mechanisms associated with the current control surfaces as well as a simplification of the outside architecture of the aeroplane (wings and stabilisers). This will result in a greater payload capacity.

With respect to the state of the technique, it must be pointed out that certain types of fixed wing aeroplanes, namely some models of combat planes, can reinforce the manoeuvres of the control surface by varying the thrust vector that takes place in the engine nozzles. They achieve this by diverting the exhaust gases into the actual nozzle, which is configured to vary its geometry in an appropriate fashion.

Helicopters. As known, the helicopter is a type of rotating wing aeroplane, which has a main propeller activated by an engine, with which it can be sustained and also move. The torque that moves the main propeller creates another torque of an opposite sign, which would make the flight cell rotate in the opposite hand to that of the propeller, if it were not for several solutions that have been developed to date. The following are the most important (*Modern Fighting Helicopters*, Bill Gunston and Mike Spick, 1998 Greenwich Editions):

Penny-farthing. An example of this configuration is the Lynx. It is the most common of all of them. The compensating torque is originated by a propeller in the tail of the fuselage, which also permits controlling the orientation in yawing of the aeroplane.

Twin tandem. Example of Chinook. This configuration possesses two main rotors, which are in the same plane and displaced, rotating in opposition, thus managing to compensate their respective torques.

Twin side. Example the V-12. The two rotors are situated on both sides of the fuselage and rotate in opposition at such regimes that the torques are compensated.

Twin intermeshing. Example HH-43. This is a variant of the previous one, where the rotors come near to each other until the blades intermesh, thus achieving a more compact configuration.

Twin coaxial. Example Ka-25. The axes of the two rotors are coaxial and cause equal torques and with an opposite sign.

In the most common configuration (the first), attempts have been made to eliminate the tail rotor, by ejecting hot gases from the engine (normally it is turbine type) through the tail of the fuselage. An example of this is the NOTAR from McDonnell Douglas. In spite of the fact that the main disadvantage of this type of configurations is the excessive expenditure of fuel, several models have been developed, all of them based on this technology.

The gyroscopic actuator, suitably placed on the inside of the fuselage of the helicopter, will enable this to have one single rotor; the main rotor, so that the torque generated is compensated by the actuator, also permitting the yawing orientation.

The advantages over the conventional procedures are derived from the elimination of the fuselage tail together with the secondary rotor. These are the following:

Mechanical simplification of the aeroplane on eliminating secondary rotor.

Reduction of the total weight. Although it is necessary to incorporate a new device (the gyroscopic actuator), an important part of the fuselage and of the mechanisms associated with the secondary rotor are eliminated, so that the resulting total mass is less than the original one.

Improvement of the aerodynamic shapes. On eliminating the secondary rotor and its support structure, an outer aerodynamic shape with more continuity is achieved, similar to a revolution ellipsoid, which grants more possibilities to the aeroplane.

Greater load capacity. With the new shape the helicopter is able to transport greater volume and greater load.

Naval. In any type of boat or vessel, the rudder is used to carry out the manoeuvre, which, as occurs with aeroplanes, produces what in short is a resulting momentum on the structure, managing to orientate it in the desired direction.

The rudder generates a hydrodynamic resistance, associated with its own action, the greater the larger its equivalent surface facing the water current lines.

The gyroscopic actuator on board a vessel, dimensioned for the purpose and suitable placed, generates in this the appropriate torque capable of varying the orientation of the whole assembly, so that the desired manoeuvres can be carried out avoiding the user of the rudder or rudders.

The advantage of this device mainly lies in the capacity that the actuator bestows upon the vessel to be able to manoeuvre without added resistances due to the increase in equivalent surface with respect to the water current lines.

Another application of the gyroscopic actuator on naval platforms is the capacity to stabilise them and even bestow the correct attitude in pitching, rolling and yawing to stably generate all types of manoeuvres. This is especially useful in sports vessels with engine or sail. With respect to this the following patents are mentioned: US004863404, US004817550

Land vehicles. The most immediate application, which is foreseen for this field, is the stabilisation of the vehicles during their movement. In the case of cars (also coaches and lorries), there are currently two types of devices that bestow stability upon the vehicle when it comes up against a sufficiently accused change in direction, such as to produce a considerable overturning torque on the structural assembly. These devices are the stabilising bars and the active damping systems. In both cases an increase in rigidity of the vehicle suspension is sought on the side of the vehicle where the pivoting due to overturning occurs and a decrease on the opposite side, so that the vehicle has a tendency to roll in the opposite direction to the overturning direction and thus counteracts the lack of stability with its own displaced mass. The following patents are mentioned as reference: US005876148, US004930807, US004550926, US005876148, US004345661, GB2039834A, DE4116837, JP57182505.

The assembly comprised of the gyroscopic actuator, together with a gyrostabilised platform and a processor is able to generate the opposite torque to the overturning torque of the vehicle, stabilising it during the execution of the swerve that produces the lack of stability. The way the assembly works is as follows: the gyrostabilised platform detects the deviation produced in pitching, rolling and yawing by the vehicle, with respect to its standby position (vehicle stopped or in movement without lack of stability). The measurements taken are transmitted to the processor, which generates the correct orders to the actuator to generate the torques that reduce the lack of stabilities of the vehicle structure.

The main advantage of the system based on the actuator compared with the other ones mentioned is the wide margin of actions it has, as in the second case, the equivalent torque created, which opposes the overturning torque, is going to depend on some very narrow margins due to its actual nature; however, with the use of the system based on the gyroscopic actuator, the torque generation possibilities will depend on the design of the actual device, not on the structural assembly, being able to be very high, as will be realised later when the mechanism is described.

In the case of railway transport, the actuator has a similar application to that described for the motor vehicles, as some of the most important speed limitative factors of the trains, is the horizontal curvature radius of the layout of the tracks, as when a train takes a bend a centrifugal acceleration occurs on the passengers, whose maximum value is limited by the valid regulations in each country. To decrease this value, there are two types of solutions: the first has been developed by the company, PATENTES TALGO, and consists of a structure of the wagons comprised of a portico from which the passenger area structure hangs, so that on taking a bend, the passenger area rolls and inclines and the centrifugal acceleration undergone by the occupants splits into two, into a normal one towards the base of the passenger area and another perpendicular one to the former, which is the one that the regulation penalises, but which is less with respect to what would have existed if the passenger area had remained perfectly horizontal (pendulum effect).

The second type of solution consists of an active damping, similar to that mentioned for the motor vehicles, which produces the appropriate inclinations of the passenger areas of the wagons.

The following patents numbers related to the above are quoted: FR2563487, FR2563487-A1, U.S. Pat. No. 5,573,265.

The gyroscopic actuator forming part of an assembly like the one described above (with stabilising platform and a processor), can, not only produce the desired inclination of the passenger area of the wagons, but can also contribute to the complete stability of the structure, generating the relative anti-overturning torque.

The main advantage for railway transport consists of the possibility of being able to travel at greater speeds than the current ones, with even greater, if possible, safety and comfort conditions.

DESCRIPTION OF THE FIGURES

FIG. 4 presents the four rings that make up the mechanism, projected on ZY plane of an inertial reference system whose Z- and X-axes coincide with the reference system linked to the solid set out in FIG. 3. The concentrically placed rings are rotated in this plane: 1 and 3 an angle $-\beta$, 2 and 4 an angle $+\beta$. The rings of the lower square (1 and 3) have a negative spin rotation speed. Those of the upper square (2 and 4) have a positive spin speed. The arrows indicate the rotations in nutation that the rings make in the conditions indicated above. Firstly 1 and 2 rotate, changing, respectively to positions $+\beta$ y $-\beta$, with which they produce the components of the torque Nx,−Ny, +Nz (ring 1) and −Nx, −Ny, −Nz (ring 2), which result in vector −2Ny, indicated in the figure. The same occurs with rings 3 and 4, which start to rotate at the end of the movement of the other two.

TECHNICAL DESCRIPTION OF THE INVENTION

All the applications mentioned above will be the subject of new patents derived from this patent. This section is going to explain the operating mode of the gyroscopic actuator, which, through several adaptations of its environment, which will not modify in any way what is going to be described, will make possible the different configurations suitable for the applications indicated above.

Figure 1:
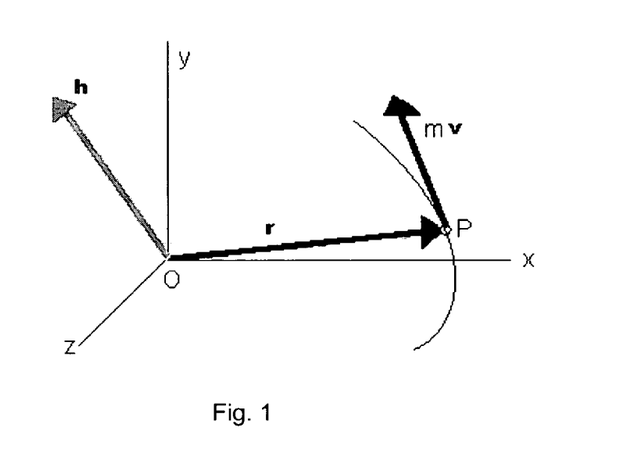
FIG. 1 represents particle P of mass m in space following a path with speed v, in a reference system Oxyz where it has a position vector r and a kinetic momentum h. It is used to illustrate the physical law, which the invention is based upon.

The gyroscopic actuator is based on the law of conservation of the kinetic momentum. The definition of the kinetic momentum of particle P (FIG. 1) of mass m, in movement with speed v respect to a Newtonian reference system Oxyz is defined as a value h resulting from the vectorial product of the vector of the quantity of movement mv with vector r of the particle position.

The law of conservation of the kinetic momentum establishes that the variation with respect to the kinetic momentum time h of particle P, produced by the application of a force F on the particle, is equal to the momentum or torque N, which produces that force F with respect to the origin O of the reference system.

$$\frac{d}{dt}\vec{h} = \vec{N}$$

The actuator has a mechanism comprised of an ensemble of ring pairs for example two pairs ring assembly, which, by means of coordinated spin and nutation rotations, produce a torque N, which satisfies the following requirements:

1. The vector of torque N must have a fixed direction and hand in the inertial reference system.
2. The module of torque N must be constant until the parameters that produce it are intentionally changed.
3. The duration of torque N under the previous conditions will be unlimited, until the parameters that produce it are intentionally changed.

Figure 2:
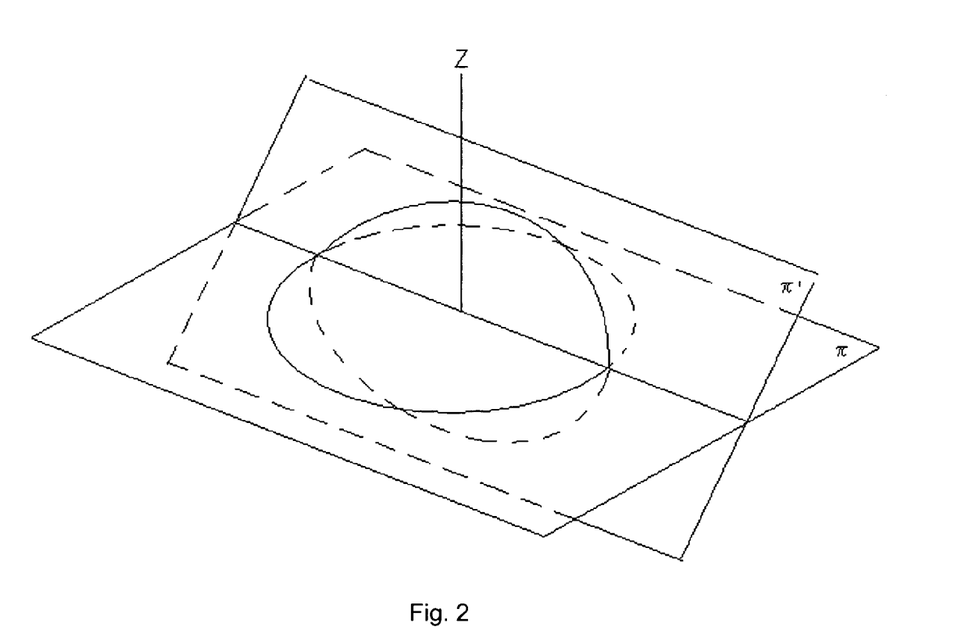
FIG. 2 presents a ring on a plane $\pi$ and also the same ring on another plane $\pi'$, which is rotated with respect to the first one. The rotation axis passes through a diameter line of the ring.

When a ring is spinning in plane π, indicated in FIG. 2 and in those circumstances, it undergoes a nutation rotation changing to orbit plane π', a change of the kinetic momentum h occurs, which involves the appearance of a torque N. The mechanism has 4 rings, which acting in sequence in pairs gets the torque N produced to satisfy the following three requirements.

The 4 rings have, according to what has been said, two degrees of freedom: spin (ψ) and nutation (θ), the precession (φ) being zero at all times.

Figure 3:
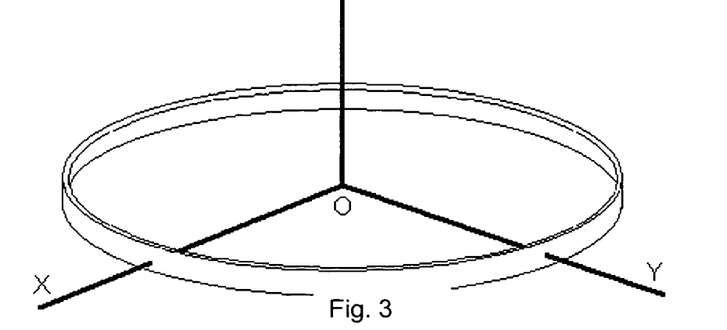
FIG. 3 shows the reference system linked to a generic ring of the type used in the mechanism. Center O coincides with the center of the ring, Z-axis coincides with the main axis perpendicular to the mean circumferential plane of the ring and X- and Y-axes are orthogonal to Z and between each other, forming a dextrorotatory system and are in the mean circumferential plane.

All the cylindrical shaped rings must have the same inertia momentums in their main axes. In FIG. 3 the reference system linked to one of the rings is seen. The spin rotation occurs around Z-axis and the nutation rotation around X-axis. The rings will be called 1, 2, 3 and 4, number 1 being the most internal one and 4 the external one. The rings spin at the same speed, in alternate hands: ring 1 in +, 2 in −, 3 in +, 4 in −.

The combined operation of the rings is by pairs, that is, ring 1 is associated with ring 2 and 3 with 4. This means that 1 and 2, when they act together, generate a torque, later 3 and 4, on acting, generate the same torque, so that an operation cycle is created comprised of two semi-cycles: first semi-cycle action of 1 and 2, second semi-cycle action of 3 and 4.

Action of the ring pairs is understood as nutation rotation (in spin they are moving continuously). Nutation movement consists, for ring 1, of the passing from one plane situated, with respect to the horizontal ZY, from an angle θ=direction torque vector (not the hand as will be commented below), constant module and controllable action time (whilst desired), which are part of the requirements mentioned above, which the gyroscopic actuator must satisfy.

Figure 6:
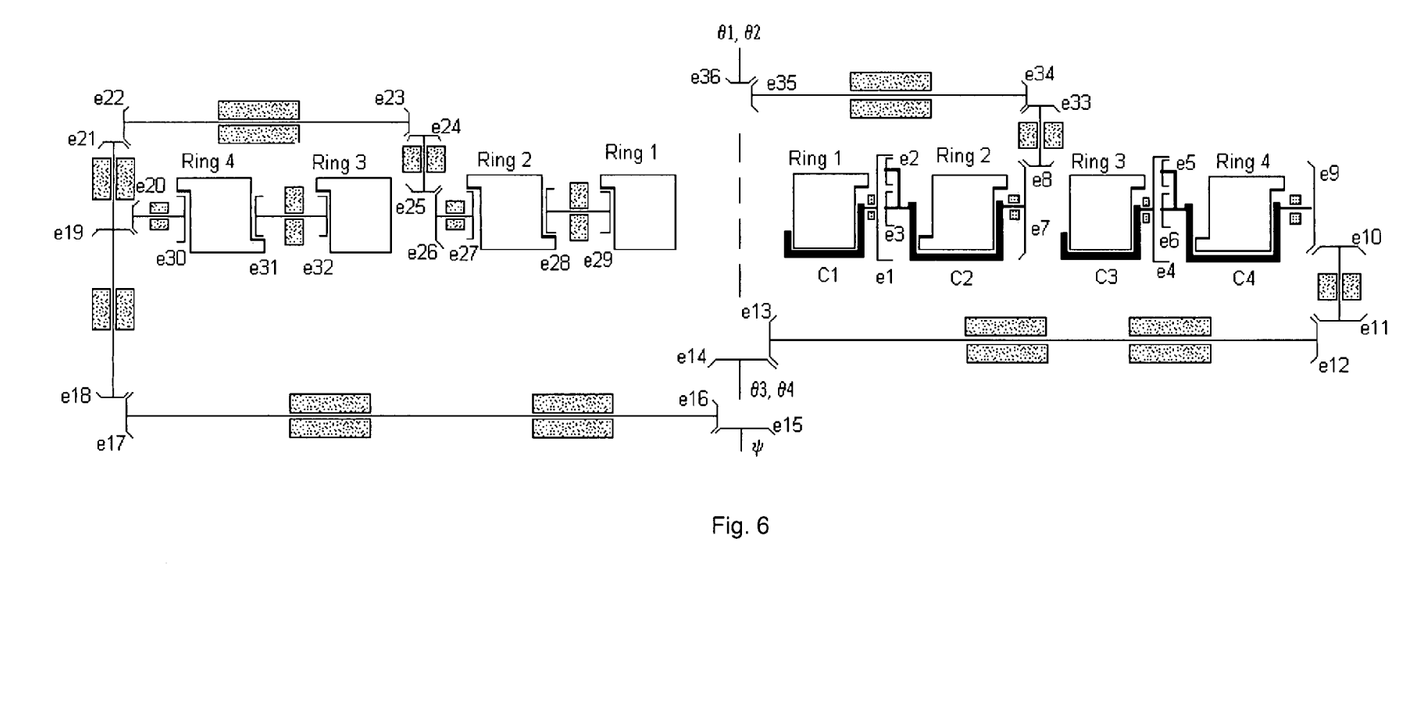
FIG. 6 shows the diagram of the mechanism of the gyroscopic actuator with its four rings projected on the XZ plane and the kinematic chains consisting of gear trains, which make the spin rotation v and nutation rotation $\theta$ reach the gear rings.

FIG. 6 shows the diagram of the mechanism of the gyroscopic actuator with its four rings projected on the XZ plane and the kinematic chains consisting of gear trains, which make the spin rotation ψ and nutation rotation θ reach the gear rings. The combined operation of the mechanism can be understood through this figure.

Bearing in mind that the mechanism basically works by coordinating the spin and nutation movements in the rings, it can be seen in this figure how the spin ψ reaches the kinematic chain through gearing e15, comprised of gearings e16, e17, e18, e19, e20 and e30, which connects with ring 4, which has a toothed sector on the upper outside part, which links with the teeth of 30, which directly communicates the spin movement (− hand). Ring 4, on its internal lower part, has another toothed sector that gears with e31, attached to e32. The latter gears with the toothed sector of the upper outside part of ring 3. Thus, this ring is made to spin but in the opposite direction to that of ring 4 (+ hand). Thus both rings rotate exactly the same number of revolutions, but with opposite directions.

Ring 2 receives the same spin movement of the gearing e15 through the chain e16, e17, e18, e19, e21, e22, e23, e24, e25, e26 and e27. This latter communicates the spin movement to ring 2, which in turn is communicated in the opposite direction to ring 1 by means of e28 and e29 in the same way as indicated for rings 4 and 3.

The nutation movement is transmitted independently to ring pairs 1,2 and 2,3. In the first case the nutation θ is received through gearing e36, which, by means of the kinematic chain e35, e34, e33, e8 and e7, whose axis is attached to wedge C2. This is a part which embraces a sector of ring 2, acting as support, the ring moves embraced by this part (wedge), which will help sustain it and also to force it to rotation in nutation θ even when it is turning in spin ψ. Therefore, when e7 spins in nutation from +β to −β, attached wedge C2 will turn and therefore ring 2. It is understood that β must not exceed the value of 70°.

When wedge C2 rotates in nutation in the way indicated, through gearings e3, e2 and e1, the rotation is communicated in the opposite hand to wedge C1, as e3 and e2 form a satellite planetary assembly and as the latter is geared with e1, which is an inner gearing. Wedge C1 forces ring 1 to rotate in nutation from −β to +β.

The nutation movement θ for rings 3 and 4 is received in gearing e14. It is transmitted through the kinetic chain e13, e12, e11, e10 and e9. The axis of this latter gearing is attached to wedge C4, which forces ring 4 to rotate in nutation from +β to −β. In the same way as was explained for rings 1 and 2, the nutation movement is now transmitted to ring 3 from 4, by means of gearings e6, e5, e4 and wedge C3.

In the later cycle the transmission of the nutation would change sign, for rings 2 and 4 this would be from −β to +β and for rings 1 and 3 from +β to −β.

The spin ψ(t) and nutation θ(t) kinematic functions reach the respective gearings e15, e14 and e36 generated by a power assembly comprised of three motors with electronic revolution and torque control. One of the motors supplies function ψ(t) to gearing e15, another supplies function θ(t) to gearing e36 and the latter also supplies function θ(t) to gearing e14.

Figure 4:
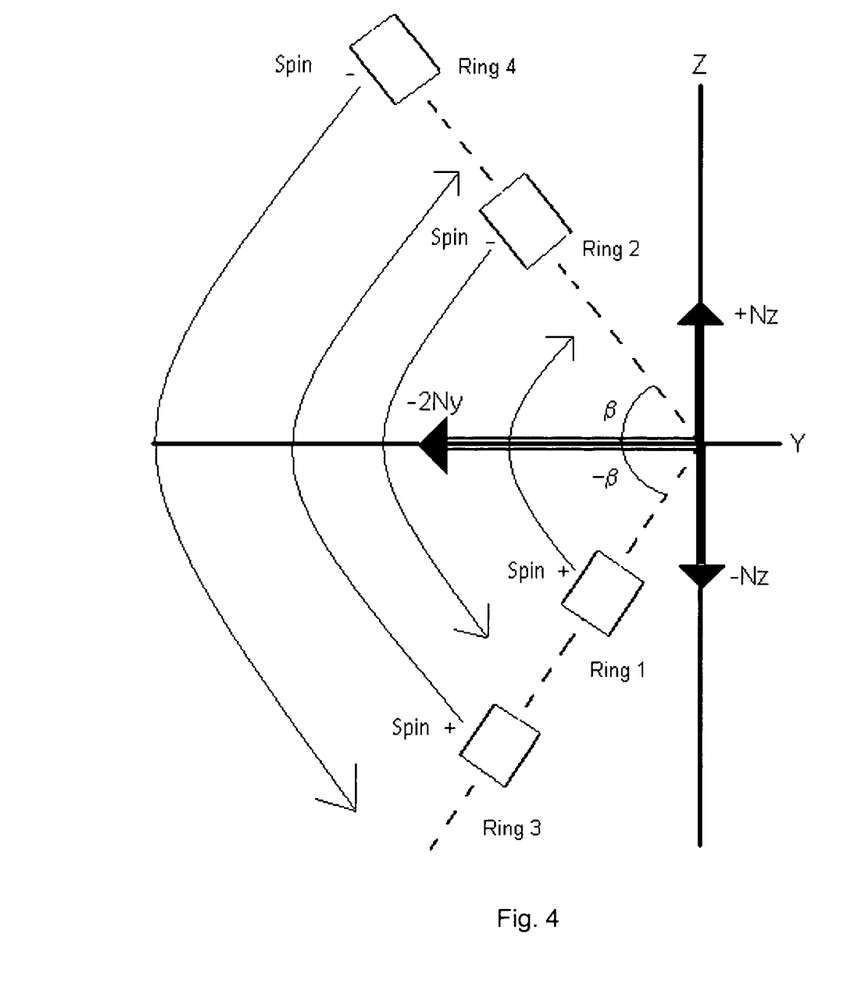

As seen, in a first cycle, as rings 1 and 2 act, a torque of −2Ny would be obtained (the minus sign is to follow the nomenclature of FIG. 4). Later when rings 3 and 4 act, the same torque −2Ny would be obtained again. However, in the next cycle, when rings 1 and 2 act, undoing the previous nutation movement, the torque obtained is 2Ny, with a change in sign. The same occurs within this second cycle when rings 3 and 4 act, which generate torque 2Ny again. Therefore a device, called torque inverter is necessary and which is illustrated in FIG. 5, which will intervene alternatively in each cycle so that the torque sign that the mechanism supplies to the platform where it is installed, is always the same.

Figure 5:
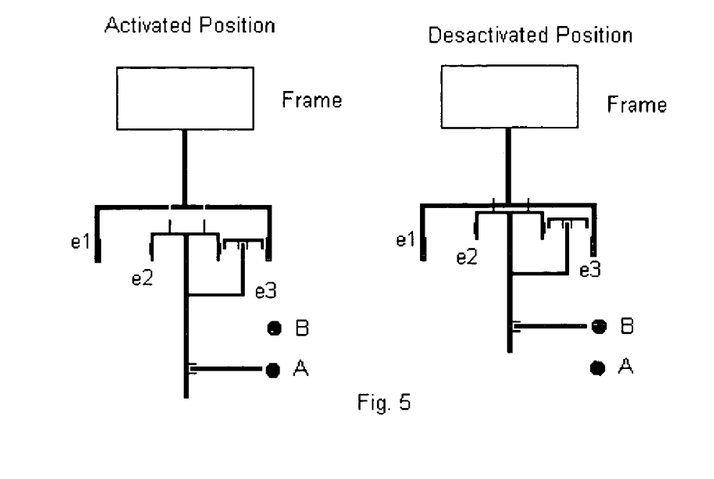
FIG. 5 shows the torque inverter, which is presented on the left in activated position (it carries out the torque inversion) and on the right in deactivated position (it does not carry out the torque inversion and delivers the same torque it receives to the frame).

In FIG. 5, the torque inverter is presented on the left in activated position (it carries out the torque inversion) and on the right in deactivated position (it does not carry out the torque inversion and delivers the same torque it receives to the frame). The inverter is comprised of a first inner gearing with two openings rigidly attached by its axle to the frame, an assembly comprised of two gearings forming satellite and planetary, the latter with two lugs, and a rod attached to the axle of the planetary gearing.

The inverter works as follows: when the rod is in A position, the torque inverter is activated and the satellite teeth are opposite the inner gearing. The torque of the mechanism is received through the axle of the planetary, which, by means of the satellite, inverts the torque that is received by the inner gearing. This inverted torque is transmitted to the frame and as a result to the platform where the gyroscopic actuator is located.

When the rod is in position B, the torque inverter is deactivated and the satellite teeth are no longer opposite the inner gearing. However, the lugs of the planetary are inserted into the openings of the inner gearing. In this situation, when the torque is received in the planetary axle it is transmitted without any inversion to the inner gearing, which transmits it to the frame without any inversion.

By means of the torque inverter device, the torque vector hand is kept constant during all the operation cycles of the mechanism, thus satisfying the three requirements mentioned at the start of this point.

The explanations given so far refer to the performance of the mechanism in permanent regime, but when the nutation rotation of a gear ring (start) is going to be started, it is necessary to pass through a transitional time interval when the ring gear evolves from a nutation speed zero to the speed demanded by the permanent regime nutation function (that derived from the nutation function $d\theta(t)/dt$).

Figure 7:
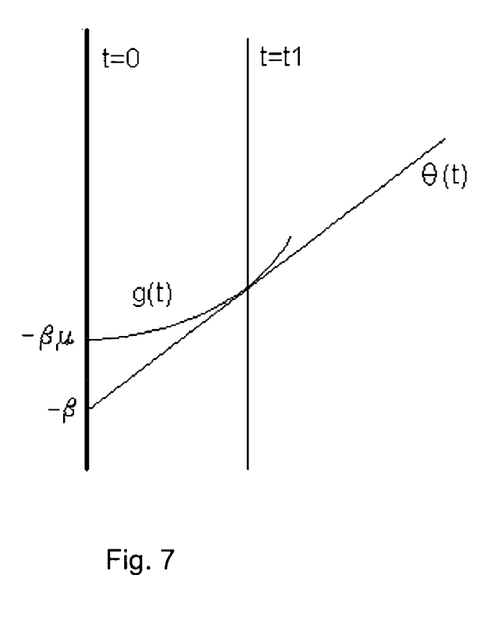
FIG. 7 is used to explain the transition that takes place when a ring begins its nutation movement.

This situation shows a discontinuity which must be saved by using a specific function for this, $g(t)$ which for the value of $g(0)=-\beta$ (or $g(0)=+\beta$) where the ring is stopped, with non-existent nutation speed, the movement (nutation rotation) can be started in a specific time (transitional time), which permits coupling to the permanent regime function at the end of the transitional interval, achieving the continuity in the point reached (that is $g(t1)=\theta(t1)$, where t1 is the value of the time at the end of the transitional period) and in the first derived ($dg(t)/dt]_{t1}=d\theta(t)/dt]_{t1}$) which is the same as there being continuity in the angular values and in the nutation speeds at the end of the transitional interval. FIG. 7 shows the process indicated.

Figure 8:
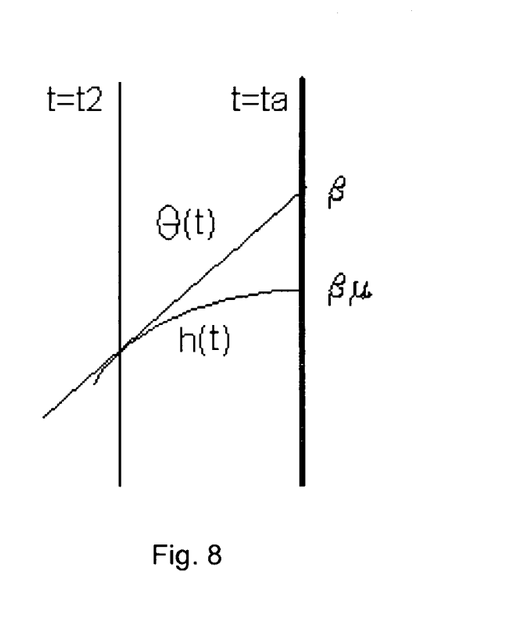
FIG. 8 is similar to the above, but referring to the stoppage of the nutation movement of a generic ring.

The same occurs when the ring reaches the end of its run in the nutation rotation and must stop. It cannot pass instantaneously from one rotation speed given by the expression $d\theta(t)/dt$ to a value of zero. It needs to go through a transitional interval, which decelerates the ring until this stops. This is the braking process. It is carried out through another kinematic function $h(t)$ which, starting for a time t2, which marks the end of the permanent regime interval, takes the ring in time t=ta to a situation where the speed of rotation is zero and its position in nutation is $\theta(ta)=\mu\beta$ (or else $\theta(ta)=-\mu\beta$), where $\mu$ is a coefficient close to 1. This situation is illustrated in FIG. 8.

Figure 9:
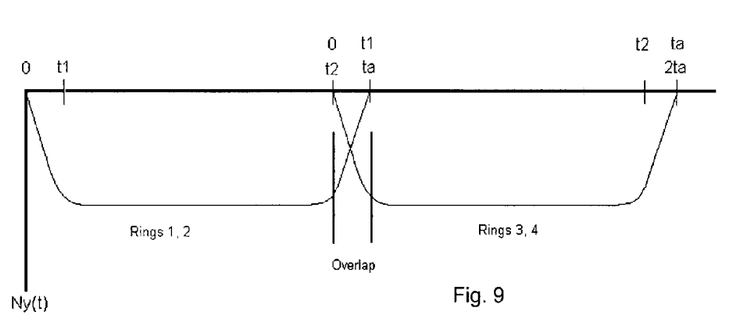
FIG. 9 is a graph where the value of the torque generated Ny(t) is set out during a combined operation cycle of the four rings. The cycle is comprised of two semi-cycles. In the first rings 1 and 2 start (between 0 and t1), then the rings evolve according to the nutation function assigned (between t1 and t2) and finally they stop (between t2 and ta). During this last interval rings 3 and 4 start (between 0 and t1 of their semi-cycle), the second semi-cycle starting. Then they also evolve depending on the nutation function assigned (between t1 and t2) and finally they stop (between t2 and ta). Thus the second semi-cycle ends and the operating cycle is completed. An action of the mechanism will require many consecutive cycles.

The transitional start functions are applied to the pair of rings that is acting (1 and 2, or 3 and 4). They will coincide in time with the transitional stop functions of the opposite pair of rings (3 and 4, or 1 and 2), so that the torques produced for each pair (one in start and another in stop), on being added together, do not produce a significant alteration of the torque that the mechanism is supplying. In these situations an overlap is reached in the combined operation of the rings, as can be seen in FIG. 9. This area is critical to achieve a correct working of the mechanism, without abrupt performances, which affect the module of torque $Ny(t)$. In any case if, due to the specific dimensioning of the mechanism for a given application, non-homogeneous performances of the value $Ny(t)$ should occur in the overlap area, a damper can be used between the frame of the mechanism and the platform which it is installed upon, which softens this irregularity to admissible values.

The cycle that appears in FIG. 9, in a real situation, will be continuously repeated until the torque of the gyroscopic actuator is no longer requested.

Figure 10:
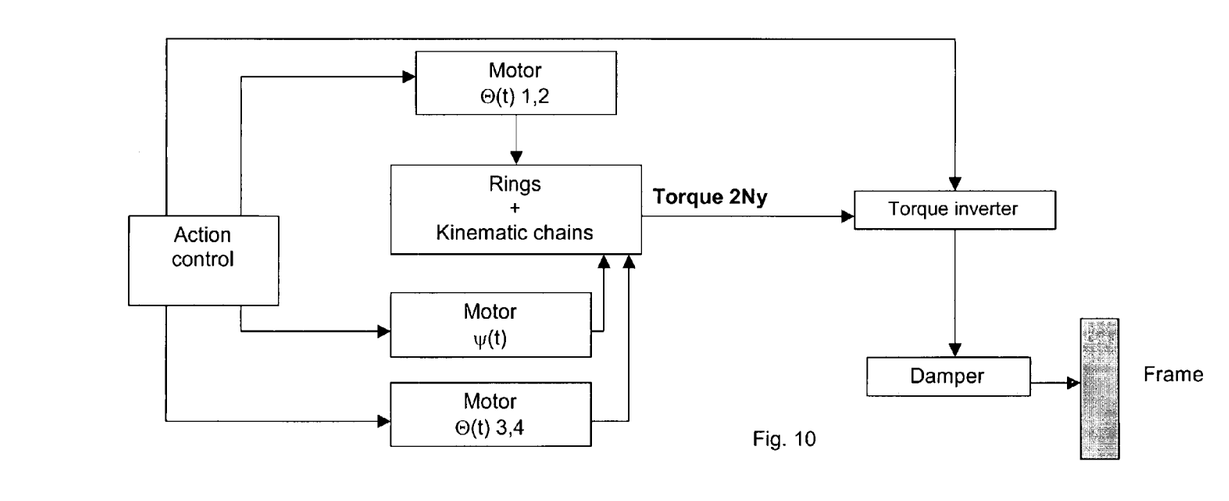
FIG. 10 shows a block diagram of the Gyroscopic Actuator. Its explanation is detailed in the Technical Description section.

FIG. 10 is a diagram of the architecture of the gyroscopic actuator where the parts that have been taken into consideration in the previous explanation can be seen in a schematic manner. A device can be seen which has not been mentioned before, that is the Action Control. This is an electronic control device, which generates the actions that must be produced by the motors, in the form of kinematic laws to produce the desired torques and their durations.

The orders from the motors are received in the kinematic chains, which move the rings in spin and nutation, thus producing the torque. This is made to pass through the Torque Inverter, which will or will not be activated depending on the cycle in question. The activation is controlled by the Action Control. Then the torque passes through the damper to soften alterations in the cycle overlap area and finally is made to reach the platform, causing its change in orientation.

The torque generated by the mechanism depends, basically, on three parameters:

Inertia of the rings. This involves the geometry (dimensions) and material making up the rings.

Spin rotation speed of the rings.

Action time of the nutation function ($t_a$ in FIG. 9) in each coordinated pair of rings.

Of the three parameters mentioned, it is going to be the last (nutation time), which is basically used to increase or decrease the module of the torque vector, when this is required. This is the one with the quickest response, because it depends on the actions of the relative motors, which generate the kinematic law according to the order received from the Action Control. In the torque expression $Ny(t)$, mentioned above, it is observed how the dependence on the action time of the nutation function, which is implicit in the expression $d\theta(t)/dt$, is inversely proportional, the less action time of the nutation, the greater the torque generated will be.

The other two parameters are not very interesting to produce rapid responses in the gyroscopic actuator. It is clear that the variation in spin is not going to be as easily modifiable as the nutation and the inertia of the rings is going to be permanent and may not be subject to any type of modification.

As it occurs that the shorter the application time of the nutation law the greater the torque generated, the limit in torque generation depends on the capacity of the material the rings are comprised of; if this has good mechanical properties; for example with very high rigidity, it undergoes insignificant deformations during its operation in nutation, the inertia momentums will remain constant, the torque generated being able to be higher and higher, until the properties of the material are insufficient to preserve the inertias of the rings, due to the appearance of significant deformations. In this situation the limits of the possibilities of the materials will have been reached for the geometry given and the spin speed established from the beginning.

In accordance with FIG. 9 and in some applications where a constant torque is not absolutely necessary and where a disturbance-variation of ±20% may be admitted with respect to the mean torque value, it would be sufficient to use the gyroscopic actuator with a single pair of rings.

In the majority of the applications two pairs of rings are used and in cases of great precision three pairs of rings are used.

These and other aspects of the present Invention may be defined in the following manner:

1: Gyroscopic actuator, of the kind that are used to produce a torque or momentum on the platform where it is located, by means of the application of the conservation law of the kinetic momentum in their internal mechanism, characterized because:

a) the torque vector has a fixed direction and hand in the inertia reference system, once this has occurred, b) the torque module delivered to the platform has a constant value or a mean value with a cyclic disturbance of less than 20% of this mean value, c) the duration of the torque under the previous conditions is unlimited unless the parameters that produce it are intentionally changed, in which case the gyroscopic actuator may carry out, as required, any of the following options:

stop delivering torque, increase or decrease the value of the module, change the direction and/or hand of the torque vector and because in order to produce the torque in the conditions mentioned it has a basic mechanism comprised of rings pairs placed concentrically, each of which act by means of a spin rotation and coordinated rotations in nutation by pairs.

2: Gyroscopic actuator according to item 1, characterized because the concentric rings that comprise the basic mechanism all have the same main inertia momentums.

3: Gyroscopic actuator according to item 1, characterized because the function of the spin rotation is linear and provides a constant rotation speed and the function of the nutation rotation is of the asin(pt±q) kind, where t is the independent time variable, and p, q two constants, so that a module with constant torque vector in the mechanism can be obtained.

4: Gyroscopic actuator according to item 3, which is characterized by the fact that it has two dependent kinematic chains so that the spin rotation reaches one ring of each pair of rings that communicates to its pair an opposite hand and the same number of revolutions of itself.

5: Gyroscopic actuator according to item 3, which is characterized by the fact that the nutation rotation is transmitted by an independent kinematic chain to each pair of rings, whose axis of the last gearing of each kinematic chain is secured to the wedge of a ring of each pair, which rotates in nutation, communicating this rotation, but in the opposite hand to the wedge of the other ring of each pair.

6: Gyroscopic actuator according to item 1, characterized because the rotation in nutation defined by the function of the previous claim, contemplates an additional function for the start in nutation and another for the stop, which act as transitional functions, placing the rings in the conditions where the movement is required.

7: Gyroscopic actuator according to item 1, characterized because it has a device to invert the torque that it produces on the platform where it is installed.

8: Gyroscopic actuator according to item 1, characterized because it can be used on naval platforms to be able to govern them in pitching, rolling and yawing, being able to replace the rudders or other control systems, as well a to stabilize the actual platform.

9: Gyroscopic actuator according to item 1, characterized because it can be used in fixed wing airplanes bestowing upon it the possibility of control in pitching, rolling and yawing.

10: Gyroscopic actuator according to item 1, characterized because it can be used in helicopters of the present-day type with compensating propeller in tail, making it possible to eliminate the tail rotor, as well as its support structure and its associated mechanisms, conferring the control in yawing.

11: Gyroscopic actuator according to item 1, characterized because it can be used in land motor vehicles to correct the dynamic lack of stability of the chassis when carrying out maneuvers with changes in direction, by generating the correct torque that counteracts the lack of stability.

12: Gyroscopic actuator according to item 1, characterized because it can be used in trains, both in driving cars and in wagons, to achieve the dynamic stability of this type of vehicle.

13: Gyroscopic actuator according to item 1, characterized because it can be used in aerospace platforms, to change their attitude with torques that can reach values of around $10^3$N-m.

The invention claimed is:

1. Gyroscopic actuator, used to produce a torque or momentum on a platform on which said gyroscopic actuator is located comprising:

a torque mechanism to deliver torque to the platform at a constant value or a mean value with a cyclic disturbance of less than 20% of the mean value, when a torque vector has a fixed direction in an inertia reference system, wherein the torque has a duration unlimited unless the parameters that produce the torque are intentionally changed, in which case the torque mechanism carries out, one or more of the following:

(a) stop delivering torque, (b) increase or decrease the value of the torque, or (c) change the torque vector direction wherein said torque mechanism is comprised of at least two pair of rings placed concentrically, each pair of rings act by spin rotation and coordinated in nutation rotation to produce torque.

2. Gyroscopic actuator according to claim 1, wherein each of said rings have the same main inertia momentums.

3. Gyroscopic actuator according to claim 1, wherein the spin rotation is linear and at a constant rotation speed and the nutation rotation is asin(pt±q), where t is an independent time variable, and p, q are constants, so that the torque vector is constant.

4. Gyroscopic actuator according to claim 3, wherein each of said pair of rings has dependent kinematic gear chains so that the spin rotation of one ring of each pair of rings communicates to the other ring of each pair of rings in an opposite direction and same number of revolutions.

5. Gyroscopic actuator according to claim 3, wherein each ring has a wedge and the nutation rotation is transmitted by an independent kinematic gear chain to each pair of rings, each kinematic gear chain is secured to the wedge of one ring of each pair of rings, and communicates rotation, in an opposite direction to the wedge of the other ring of each pair of rings.

6. Gyroscopic actuator according to claim 5, wherein the wedge has an activated position and a deactivated position.

7. Gyroscopic actuator according to claim 1, wherein the torque mechanism has a device to invert the torque.

* * * * *